United States Patent
Onuma et al.

(10) Patent No.: US 10,467,305 B2
(45) Date of Patent: Nov. 5, 2019

(54) EXTRACTION DEVICE, SEARCH SERVER, INFORMATION PROCESSING DEVICE, EXTRACTION SYSTEM, EXTRACTION METHOD, AND NON-TRANSITORY COMPUTER READABLE STORAGE MEDIUM

(71) Applicant: YAHOO JAPAN CORPORATION, Tokyo (JP)

(72) Inventors: Sho Onuma, Kanagawa (JP); Shumpei Okura, Tokyo (JP); Akihiro Koide, Tokyo (JP); Makoto Kataigi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 502 days.

(21) Appl. No.: 14/821,302

(22) Filed: Aug. 7, 2015

(65) Prior Publication Data
US 2016/0048597 A1    Feb. 18, 2016

(30) Foreign Application Priority Data
Aug. 13, 2014 (JP) .................. 2014-164949

(51) Int. Cl.
*G06F 17/30* (2006.01)
*G06F 16/9535* (2019.01)
(Continued)

(52) U.S. Cl.
CPC ...... *G06F 16/9535* (2019.01); *G06F 16/2455* (2019.01); *G06F 16/24575* (2019.01)

(58) Field of Classification Search
CPC ......... G06F 17/30867; G06F 17/30477; G06F 17/30528
See application file for complete search history.

(56) References Cited

U.S. PATENT DOCUMENTS 7,146,416 B1 * 12/2006 Yoo .................. G06F 17/30867
                                                                 709/224
8,775,471 B1 * 7/2014 Kozyrczak ............ G06Q 30/02
                                                                 707/748
(Continued)

FOREIGN PATENT DOCUMENTS

| JP | 2005-316590 A | 11/2005 |
| JP | 2010-182340 A | 8/2010 |
| JP | 2012-194900 A | 10/2012 |

OTHER PUBLICATIONS

Feb. 28, 2017 Office Action issued in Japanese Patent Application No. 2014-164949.
(Continued)

*Primary Examiner* — Etienne P Leroux
*Assistant Examiner* — Husam Turki Samara
(74) *Attorney, Agent, or Firm* — Oliff PLC

(57) ABSTRACT

An extraction device according to the present application includes an acquisition unit and a notification unit. The acquisition unit makes a web search engine execute extraction processing based on an arbitrary query received from an information user and acquires, as an extraction result, the number of users corresponding to the arbitrary query from behavior histories of users to be processed. The notification unit notifies the number of users acquired by the acquisition unit to the information user who posts the arbitrary query. More specifically, based on a query related to setting of a condition about behavior or an attribution of the user, the acquisition unit acquires the number of users corresponding to the query.

12 Claims, 9 Drawing Sheets

(51) Int. Cl.
G06F 16/2455 (2019.01)
G06F 16/2457 (2019.01)

(56) References Cited

U.S. PATENT DOCUMENTS

| | | | | |
|---|---|---|---|---|
| 9,465,875 | B2* | 10/2016 | Barkol | G06F 17/30867 |
| 2005/0102259 | A1* | 5/2005 | Kapur | G06F 17/30867 |
| 2008/0255935 | A1* | 10/2008 | Madhavan | G06Q 30/02 |
| | | | | 705/14.64 |

OTHER PUBLICATIONS

Jul. 5, 2016 Office Action issued in Japanese Patent Application No. 2014-164949.

* cited by examiner

EXTRACTION DEVICE, SEARCH SERVER, INFORMATION PROCESSING DEVICE, EXTRACTION SYSTEM, EXTRACTION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-164949 filed in Japan on Aug. 13, 2014.

BACKGROUND OF THE INVENTION

1. Field of the Invention

The present invention relates to an extraction device, a search server, an information processing device, an extraction system, an extraction method, and a non-transitory computer readable storage medium having stored therein an extraction program.

2. Description of the Related Art

Recently, along with a wide spread of the Internet, advertisement distribution through the Internet is performed actively. In such advertisement distribution, targeting distribution in which a user attribution such as a taste, a gender, an age, an address, or an occupation of a user is previously registered as user data and advertisement corresponding to the user data is selectively distributed is performed to improve an advertising effect.

In the targeting distribution, browse information of when a user terminal accesses an arbitrary website or a behavior history such as a usage history of a search site is compiled as user data into a database. Then, by using the user data compiled in the database, effective advertisement distribution can be expected. As a technology of such a database, for example, a technology to perform profile matching between users appropriately has been known.

However, in the above conventional technique, it is hard to say that user data is used flexibly. More specifically, the user data includes browse information or the like of when a user terminal accesses a website. Thus, transmission to a device which processes user data is performed constantly. Thus, for example, in a processing device to manage a large amount of user data in a data management platform (DMP) business or the like, user data having an enormous amount of information is managed. Thus, it is difficult to analyze user data accumulated in the processing device expeditiously according to various requests from a user of data (such as advertiser).

SUMMARY OF THE INVENTION

It is an object of the present invention to at least partially solve the problems in the conventional technology.

An extraction device according to the present application includes an acquisition unit configured to make a web search engine execute extraction processing based on an arbitrary query received from an information user and to acquire, as an extraction result, the number of users corresponding to the arbitrary query among users whose behavior histories are stored in a storage unit and a notification unit configured to notify the number of users acquired by the acquisition unit to the information user who transmits the arbitrary query.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, a mode to carry out an extraction device, a search server, an information processing device, an extraction system, an extraction method, and a non-transitory computer readable storage medium having stored therein an extraction program which are according to the present application (hereinafter, referred to as "embodiment") will be described in detail with reference to the drawings. Note that the extraction device, the search server, the information processing device, the extraction system, the extraction method, and the non-transitory computer readable storage medium having stored therein an extraction program are not limited to the embodiment. Also, in the following embodiment, the same reference sign is assigned to identical parts and an overlapped description is omitted.

1. Extraction Processing

Figure 1:
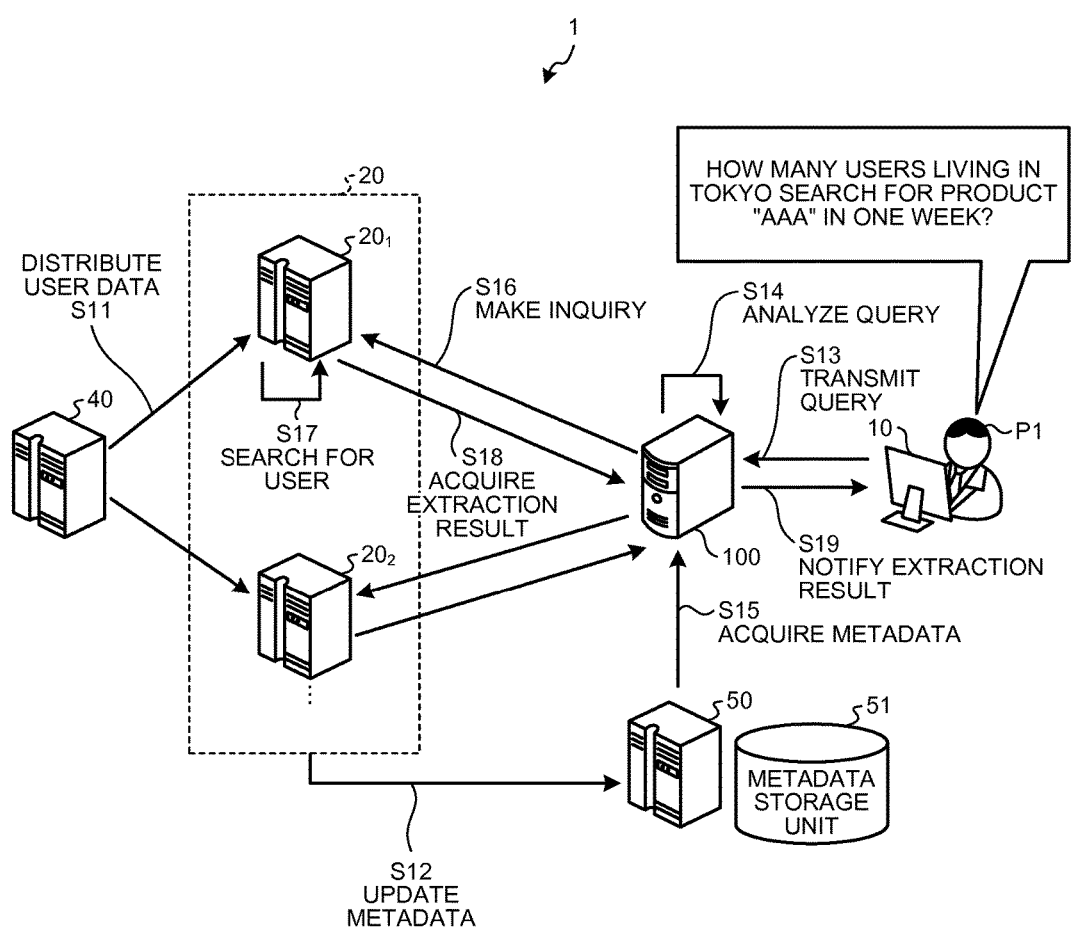
FIG. 1 is a view illustrating an example of extraction processing according to an embodiment.

First, with reference to FIG. 1, an example of extraction processing according to an embodiment will be described. FIG. 1 is a view illustrating an example of the extraction processing according to the embodiment. In FIG. 1, processing of extracting a user corresponding to a predetermined condition from users to be processed will be described with an extraction processing system 1 as an example.

As illustrated in FIG. 1, the extraction processing system 1 includes a user terminal 10, a search server 20, a user data server 40, a metadata server 50, and an extraction device 100. The extraction device 100 is connected to the user terminal 10, the search server 20, the user data server 40, and the metadata server 50 in a communicable manner through a not-illustrated network N (such as Internet).

Note that the number of user terminals 10, search servers 20, user data servers 40, and metadata servers 50 included in the extraction processing system 1 is not limited to the example illustrated in FIG. 1. For example, the extraction processing system 1 may include two or more user terminals 10.

The user terminal 10 is an information terminal used by an information user P1. The user terminal 10 is, for example, a mobile terminal such as a smartphone, a tablet terminal, or a personal digital assistant (PDA), a desktop personal computer (PC), or a laptop PC.

The information user P1 is a person who acquires information by using the extraction processing system 1. For example, the information user P1 is a distributor to sell a predetermined product "AAA" or an advertiser intending to distribute an advertisement related to the product "AAA." For example, the information user P1 acquires information related to a user interested in the product "AAA" by using the extraction processing system 1.

The search server 20 is a server device to extract information by using a predetermined web search engine. As illustrated in FIG. 1, a plurality of search servers 20 such as a search server $20_1$ and search server $20_2$ is provided to distribute a load of search processing. In the following, when it is not necessary to distinguish the search server $20_1$ and the search server $20_2$ from each other, these are integrally referred to as the "search server 20."

The user data server 40 is a server device to acquire user data and to hold the acquired user data. Here, a user is a person to be an object of the extraction processing performed by the extraction processing system 1. For example, the user data is data related to a behavior history of the user who browses a predetermined website or performs a search on a search site through the network N. Note that the behavior history of the user includes, for example, behavior of inputting information such as a gender, an age, or an address of a user on a predetermined website (such as member registration on predetermined website). Thus, there is a case where the user data includes attribution information of the user such as a gender, an age, or an address of the user. Also, the user data is not limited to the behavior history or the like on a web and may include, for example, a history of a purchase by the user in an actual store operated by the information user P1.

The metadata server 50 is a server device to hold metadata related to user data. For example, the metadata indicates an address, where user data is stored, or an update date and time of data and has a role as an index of the user data.

The extraction device 100 is a server device to provide a result of the extraction processing to the information user P1. More specifically, the extraction device 100 receives arbitrary query from the user terminal 10, makes the search server 20 execute extraction processing based on the received query, and provides a result of the extraction processing to the user terminal 10.

In the extraction processing system 1, processing to extract, from the user data held in the user data server 40, a user corresponding to a condition indicated by a query posted by the information user P1 is executed. Here, it is preferable that the extraction processing is used easily by the information user P1 and a result is extracted at high speed in the processing. Thus, in the extraction processing system 1, it is made possible to calculate an extraction result corresponding to an intention of the information user P1 at high speed by searching user data in a predetermined web search engine. This point will be described with reference to the example in FIG. 1.

In the example illustrated in FIG. 1, an example in which the extraction device 100 provides, to the information user P1, information related to the number of users corresponding to a query posted by the information user P1 will be described.

In the example illustrated in FIG. 1, the user data server 40 makes the acquired user data distributed and held in the search server $20_1$ and the search server $20_2$ (step S11). In the extraction processing described later, each of the search server $20_1$ and the search server $20_2$ processes only user data held in itself. Thus, an extraction result can be transmitted back at high speed.

That is, each of the search server $20_1$ and the search server $20_2$ receives user data from the user data server 40. Then, the search server $20_1$ and the search server $20_2$ updates metadata of the held user data at a time point at which reading processing of the acquired user data is completed and it becomes possible to set the user data as an object of the extraction processing (step S12). More specifically, each of the search server $20_1$ and the search server $20_2$ transmits, to the metadata server 50, metadata of, for example, information indicating that extraction processing with respect to the held user data becomes possible or information indicating a location of the held user data. Then, the metadata server 50 updates metadata by storing the acquired metadata into a metadata storage unit 51.

Here, the information user P1 who uses the extraction processing system 1 transmits an arbitrary query to the extraction device 100 through the user terminal 10 (step S13). The arbitrary query is indicated, for example, by an arbitrary text input into the user terminal 10 by the information user P1. In the example illustrated in FIG. 1, the user terminal 10 transmits a query indicating "How many users living in Tokyo search for a product "AAA" in a week?" to the extraction device 100.

Then, the extraction device 100 analyzes the query received from the user terminal 10 (step S14). More specifically, the extraction device 100 analyzes the query received from the user terminal 10 and resolves the query into a form which can be processed by a web search engine related to the search server 20. For example, the extraction device 100 resolves the received query into two kinds of search objects which are "living in Tokyo" and "recent one week, a product "AAA," and a search." Accordingly, the search server 20 can determine whether a user is a user "living in Tokyo" based on attribution information of the user. Also, the search server 20 can determine whether the user is a user who performs behavior corresponding to "recent one week, a product "AAA," and a search" based on a behavior history of the user. In such a manner, the extraction device 100 converts the arbitrary query received from the user terminal 10 into a form which can be used by the search server 20.

Then, the extraction device 100 accesses the metadata server 50 and acquires the metadata stored in the metadata storage unit 51 (step S15). Then, the extraction device 100 generates extraction information, which is information to extract a result corresponding to a condition intended by the information user P1, with reference to metadata related to the analyzed query.

The extraction information includes information such as "living in Tokyo" which information is to be a search object for execution of a search by the search server 20 and time information to be a reference in execution of the search (hereinafter, referred to as "reference date and time").

In the following, the reference date and time will be described. As described above, the reference date and time is used to acquire an extraction result corresponding to a condition intended by the information user P1. Here, the user data is continually acquired by the user data server 40 and is continually distributed to the search server 20$_1$ and the search server 20$_2$ and is processed. Thus, there may be a gap between time at which the search server 20$_1$ can start processing of the user data and time at which the search server 20$_2$ can start processing of the user data. Then, when the extraction device 100 transmits information for the extraction processing to the search server 20$_1$ and the search server 20$_2$ without referring to the reference date and time, an extracted user may be different on a predetermined date and time.

For example, it is assumed that there are two users who perform the same search behavior on the same date and time and that user data of one user is held in the search server 20$_1$ and user data of the other user is held in the search server 20$_2$. Then, it is assumed that reading processing of the user data of the one user is over in the search server 20$_1$ and the user data is an object of the extraction processing and that reading processing of the user data of the other user is not over in the search server 20$_2$ and the user data is not an object of the extraction processing. Here, when the extraction processing is executed in the search servers 20$_1$ and 20$_2$, the one user is extracted as a user corresponding to a condition in the search server 20$_1$. However, even when a user has the same behavior history, the user is not extracted as a user corresponding to the condition in the search server 20$_2$. This indicates that a variation is generated in the extracted result when a plurality of search servers 20 performs a search at the same time. Thus, in the extraction processing executed without referring to the reference date and time, reliability of extracted data may not be secured.

Thus, by referring to metadata, the extraction device 100 refers to information indicating whether reading of user data is completed in all search servers 20 which perform the extraction processing. Then, the extraction device 100 sets a date and time, which is in metadata and which indicate that reading of user data is completed, as a reference date and time in the extraction information. Then, the extraction device 100 generates extraction information including the set reference date and time and contents of a search object. The extraction device 100 can acquire reliable data, which does not vary among the search servers 20, by making the search servers 20 execute the search based on the generated extraction information.

Then, based on the generated extraction information, the extraction device 100 makes an inquiry to each of the search server 20$_1$ and the search server 20$_2$ about the search (step S16). In other words, the extraction device 100 transmits extraction information to the search server 20$_1$ and the search server 20$_2$ and makes the each of the search server 20$_1$ and the search server 20$_2$ execute extraction processing based on the transmitted extraction information. Based on the transmitted extraction information, each of the search server 20$_1$ and the search server 20$_2$ uses a web search engine and searches for a user, who corresponds to a condition, in the held user data (step S17). Then, by counting the number of searched users, each of the search server 20$_1$ and the search server 20$_2$ calculates the number of users which number is a result. Then, each of the search server 20$_1$ and the search server 20$_2$ transmits, as a result of the extraction processing, the calculated number of users to the extraction device 100.

By receiving the extraction result transmitted from each of the search server 20$_1$ and the search server 20$_2$, the extraction device 100 acquires each extraction result (step S18). Then, by combining the number of users acquired from the search server 20$_1$ and that acquired from the search server 20$_2$, the extraction device 100 counts the number of users intended by the information user P1. Then, the extraction device 100 notifies the counted extraction result (the number of users) to the user terminal 10 (step S19).

As described above, based on the arbitrary query received from the information user P1, the extraction device 100 according to the embodiment makes a predetermined web search engine execute the extraction processing and acquires, as an extraction result, the number of users corresponding to the arbitrary query among the users behavior histories of which are stored in a predetermined storage unit. Also, the extraction device 100 according to the embodiment notifies the acquired number of users to the information user P1 who transmits the arbitrary query.

In such a manner, the extraction device 100 according to the embodiment can extract a user, which corresponds to a condition intended by the information user P1, at high speed by using an existing web search engine with respect to the user data. Generally, data such as user data is held by a system such as a relational database (RDB) or a key-value store (KVS). Then, in a case of using data, object data is extracted by a reading system corresponding to each system. However, in a case of using the RDB, it is difficult for the information user P1 to add a free column and it is difficult to say that appropriate data can be extracted from a great amount of data. Also, in the KVS, a certain key is specified and reading processing of data is performed. Thus, it is difficult to say that the information user can use data by flexibly specifying a condition. On the other hand, according to the extraction device 100 of the embodiment, a search is performed by using a web search engine with respect to user data such as a behavior history or the like of a user. Thus, the information user can extract data by using a free condition. Also, in the web search engine, detailed data of each user is not transmitted back as an extraction result. Alternatively, the number of users extracted from the user data according to the condition (which user is hit in search) is transmitted back. Accordingly, the extraction device 100 according to the embodiment can transmit back an extraction result, which corresponds to a purpose of the information user P1, at high speed among a great amount of user data used in a DMP business. That is, the information user P1 can promptly recognize the number of users interested in a specific product. For example, when the information user P1 is an advertiser, the number of users to which an advertisement of a specific product is to be distributed can be promptly recognized. Also, the information user P1 can freely set a condition related to extraction of a user. Thus, the number of users in a consumer class in which an advertisement effect is assumed to be higher can be easily recognized. In such a manner, according to the extraction device 100 of the embodiment, the information user P1 can use the user data flexibly.

2. Configuration of Extraction Device 100

Figure 2:
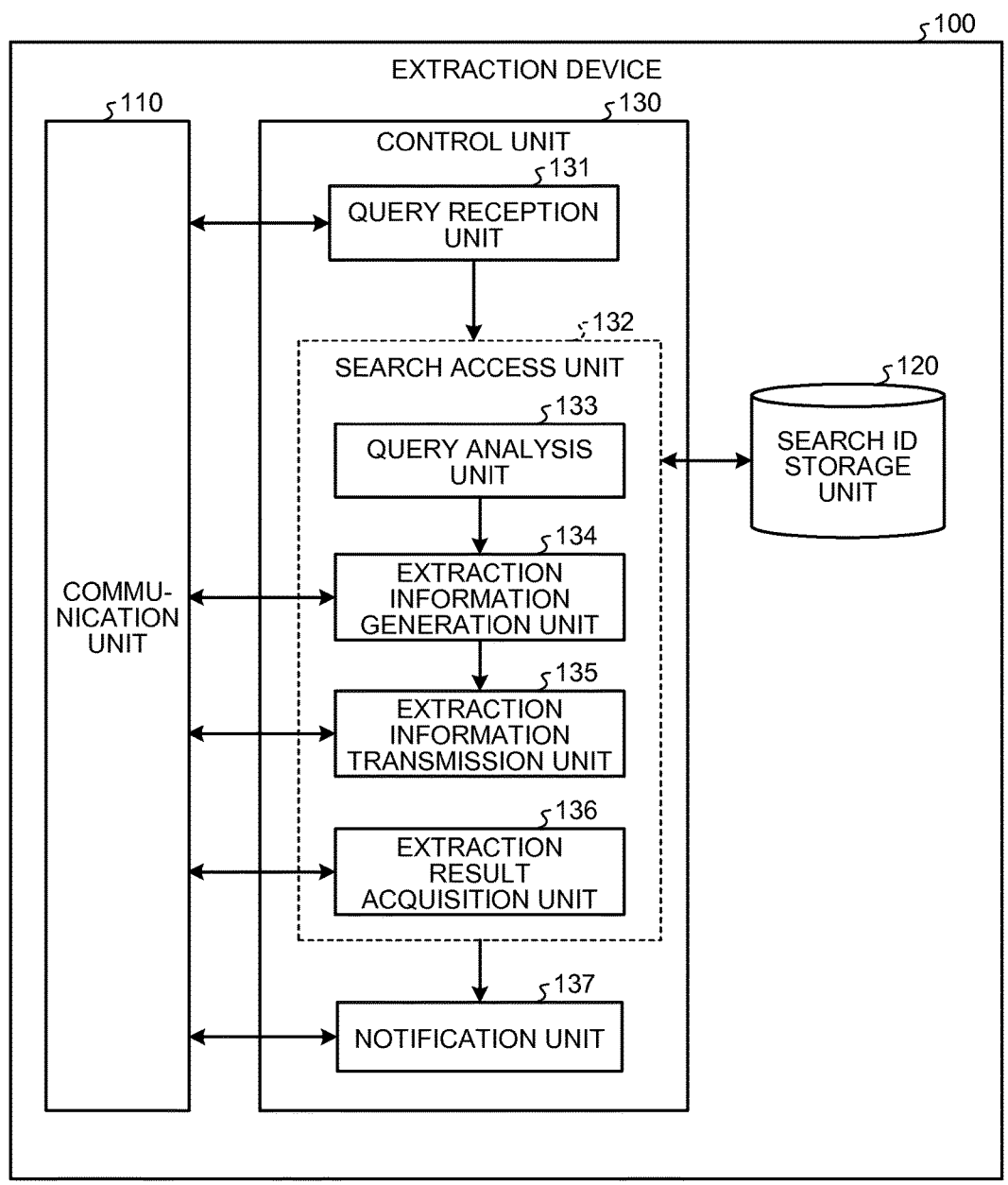
FIG. 2 is a view illustrating a configuration example of an extraction device according to the embodiment.

Next, with reference to FIG. 2, a configuration of the extraction device 100 according to the embodiment will be described. FIG. 2 is a view illustrating a configuration example of the extraction device 100 according to the embodiment. As illustrated in FIG. 2, the extraction device 100 includes a communication unit 110, a search ID storage unit 120, and a control unit 130.

(Communication Unit 110)

The communication unit 110 is connected to the network N in a wired or wireless manner and transmits/receives information to/from the user terminal 10, the search server 20, and the metadata server 50. For example, the communication unit 110 is realized by a network interface card (NIC).

(Search ID Storage Unit 120)

The search ID storage unit 120 is realized, for example, by a semiconductor memory element such as a random access memory (RAM) or a flash memory or a storage device such a hard disk or an optical disk.

Figure 3:
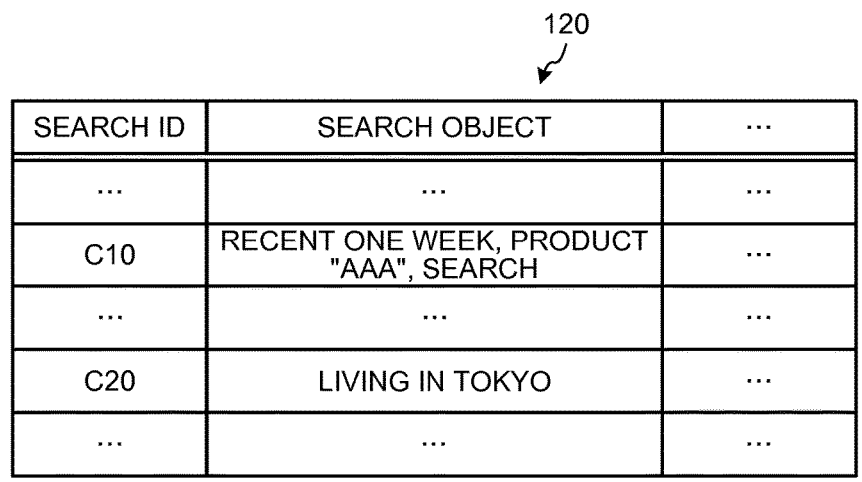
FIG. 3 is a view illustrating an example of a search ID storage unit according to the embodiment.

The search ID storage unit 120 stores a search ID based on a query posted by the user terminal 10. Here, an example of the search ID storage unit 120 according to the embodiment is illustrated in FIG. 3. In the example illustrated in FIG. 3, the search ID storage unit 120 has items such as a "search ID" and a "search object."

The "search ID" is contents of a condition indicated by the query posted by the user terminal 10 and indicates identification information for identification of contents of search processing to be executed by the search server 20. More specifically, the "search ID" is a behavior history such as "recent one week, a product "AAA," and a search" or identification information to identify attribution information of a user such as "living in Tokyo" which behavior history or identification information relates to the analyzed query. Note that in the following, there is a case where the search ID is used as a reference signal of a search object. For example, there is a case where a search object identified by a search ID "C10" is referred to as a "search object C10."

The "search object" is contents of a condition indicated by a query posted by the user terminal 10 and indicates contents of an attribution or a behavior of a user to be a search object. More specifically, when receiving a query indicating "How many users living in Tokyo search for a product "AAA" in a week?" from the user terminal 10, the extraction device 100 analyzes a condition indicated by the query in such a manner that "recent one week, a product "AAA," and a search" and "living in Tokyo" are search objects. Then, the extraction device 100 assigns a search ID to each search object and stores the search ID and the search object into the search ID storage unit 120 while associating the two to each other.

That is, in FIG. 3, an example in which the search ID "C10" is assigned to the search object "recent one week, a product "AAA," and the search" and a search ID "C20" is assigned to the search object "living in Tokyo" is illustrated.

Control Unit 130

The control unit 130 is realized, for example, when various programs stored in a storage device in the extraction device 100 is executed by a central processing unit (CPU) or a micro processing unit (MPU) with a random access memory (RAM) as a working area. Also, the control unit 130 is realized, for example, by an integrated circuit such as an application specific integrated circuit (ASIC) or a field programmable gate array (FPGA).

As illustrated in FIG. 2, the control unit 130 includes a query reception unit 131, a search access unit 132, and a notification unit 137 and realizes or executes a function or an effect of the information processing described in the following. Note that an inner configuration of the control unit 130 is not limited to the configuration illustrated in FIG. 2 and may be a different configuration as long as information processing described later is performed. Also, a connection relation between the processing units included in the control unit 130 is not limited to the connection relation illustrated in FIG. 2 and may be a different connection relation.

Query Reception Unit 131

The query reception unit 131 receives a posted query. More specifically, the query reception unit 131 according to the embodiment receives an arbitrary query corresponding to an intention of the information user P1 from the user terminal 10.

Search Access Unit 132

The search access unit 132 accesses a device which performs search processing and transmits/receives predetermined information. As illustrated in FIG. 2, the search access unit 132 according to the embodiment includes a query analysis unit 133, an extraction information generation unit 134, an extraction information transmission unit 135, and an extraction result acquisition unit 136.

Query Analysis Unit 133

The query analysis unit 133 analyzes the received query in such a manner that a web search engine related to the search server 20 can perform the search processing. More specifically, the query analysis unit 133 according to the embodiment analyzes the received query into a unit of attribution information or behavior information of a user to be a search object in such a manner that a condition indicated by the query can be recognized by the web search engine. For example, when the query reception unit 131 receives a query indicating "How many users living in Tokyo searches for a product "AAA" in a week?" from the user terminal 10, the query analysis unit 133 analyzes the received query into two kinds of search objects which are "living in Tokyo" and "recent one week, a product "AAA," and a search."

Then, the query analysis unit 133 determines whether a search ID was previously assigned to each search object. More specifically, the query analysis unit 133 refers to a search ID stored in the search ID storage unit 120. Then, when a search object to which a search ID was not assigned previously is included in the analyzed query, the query analysis unit 133 issues a new search ID and assigns the ID to the search object. Then, the query analysis unit 133 stores the search ID and the search object into the search ID storage unit 120 while associating the two to each other.

Extraction Information Generation Unit 134

The extraction information generation unit 134 generates extraction information. More specifically, based on the information analyzed by the query analysis unit 133, the extraction information generation unit 134 according to an embodiment generates extraction information with which the web search engine specifies an extraction object. As described above, the extraction information includes information related to a search object which information is for execution of search processing by the search server 20 and information related to a reference date and time specified based on metadata. Here, the metadata storage unit 51 which stores the metadata will be described.

Metadata Storage Unit 51

The metadata storage unit 51 is a storage device included in the metadata server 50. For example, the metadata storage unit 51 is realized by a semiconductor memory element such as a RAM or a flash memory, or a storage device such as a hard disk or an optical disk.

The metadata storage unit 51 stores metadata related to the user data held in the search server 20. Here, in FIG. 4, an example of the metadata storage unit 51 according to the embodiment is illustrated. In the example illustrated in FIG. 4, the metadata storage unit 51 has items such as a "search ID," a "reference date and time," and a "state."

The "search ID" is information acquired as a result of analyzing the user data acquired by the search server 20 from the user data server 40 and indicates identification information to identify information including an attribution or a behavior history of a user which information is a search object of the search server 20. Note that as a search ID assigned to a search object in a case where the search server 20 analyzes the user data and a search ID assigned to the search object when the extraction device 100 analyzes a query, a common search ID is issued with respect to similar search objects. In other words, the extraction device 100 assigns the same search ID to a query indicating contents identical with that of the search object stored in the acquired metadata. Accordingly, the search server 20 can search for a user corresponding to the search object transmitted from the extraction device 100.

Figure 4:
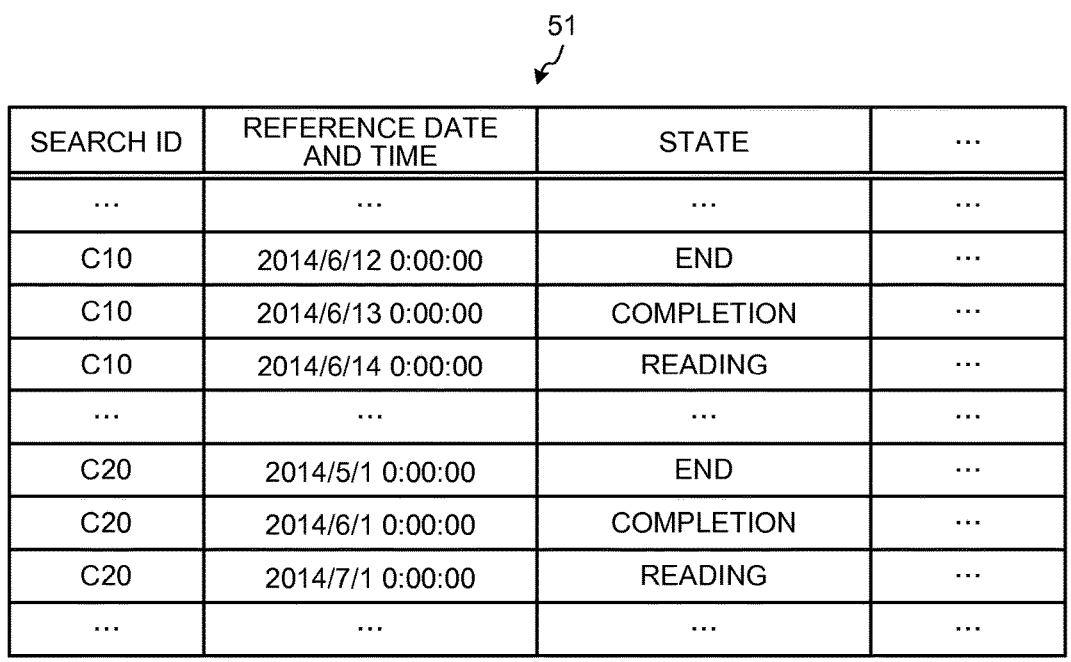
FIG. 4 is a view illustrating an example of a metadata storage unit according to the embodiment.

The "reference date and time" indicates a time and date to be a reference in a case where the search server 20 executes a search. As illustrated in FIG. 4, for example, in contents of the search object with the search ID "C10," a reference date and time is updated in a unit of 24 hours such as "00:00:00 on Jun. 12, 2014," "00:00:00 on Jun. 13, 2014," "00:00:00 on Jun. 14, 2014," . . . . Also, it is indicated that a reference date and time is updated in a unit of one month such as "00:00:00 on May 1, 2014," "00:00:00 on Jun. 1, 2014," "00:00:00 on Jul. 1, 2014," . . . in the contents of the search object with the search ID "C20." In such a manner, there is a case where update timing of a reference date and time is different depending on contents of the held user data. For example, metadata of data, which is more reliable when being relatively new, such as a search behavior which is a search object indicated by the search ID "C10" is preferably updated frequently. On the other hand, with respect to attribution information such as an address of a user which information is a search object indicated by the search ID "C20," reliable data is more likely to be acquired even when update of metadata is performed less frequently compared to the search behavior or the like. In such a manner, the search server 20 reduces a processing load in the update by arbitrarily changing timing to update metadata with respect to each search object.

The "state" indicates a reading state of user data in each of the search server 20₁, the search server 20₂ . . . and a search server 20, (n is arbitrary number) at a time point of a reference date and time corresponding to a search ID. An "end" in an item of the "state" indicates a reference date and time which are not used in search processing at a current time point since a newer reference date and time are set. "Completion" in an item of the "state" indicates that reading processing of user data in all search servers 20 is completed at a current time point. That is, the extraction information generation unit 134 according to the extraction device 100 generates extraction information, with which the search server 20 extracts an object, by using a reference date and time in the "completion" state. "Reading" in an item of the "state" indicates that reading of user data is being performed in any of the search servers 20 at current time point. As described above, when the extraction information generation unit 134 generates extraction information by using a reference date and time in the "reading" state, extraction processing in which a variation in extraction results is generated between the search servers 20 may be executed. Thus, the extraction information generation unit 134 does not generate extraction information by using the reference date and time in the "reading" state.

That is, in FIG. 4, it is indicated that a reference date and time "00:00:00 on Jun. 12, 2014" with respect to the search object to which the search ID "C10" is assigned is in the "end" state. Also, a reference date and time "00:00:00 on Jun. 13, 2014" indicates the "completion" state. Also, a reference date and time "00:00:00 Jun. 14, 2014" indicates the "reading" state.

Here, the extraction information generation unit 134 acquires the information stored in the metadata storage unit 51. Then, based on metadata related to a behavior history, the extraction information generation unit 134 generates extraction information in which a reference date and time is set, the reference date and time being a date and time to be a reference with which the web search engine determines whether a behavior history is a behavior history to be an object of a search. Note that based on the metadata related to the behavior history, the extraction information generation unit 134 generates extraction information indicating an identical or similar search object from a query indicating contents identical or similar to contents which are search objects of the web search engine. Accordingly, the extraction information generation unit 134 can generate extraction information consistent with contents which are the search objects of the web search engine. As described above, the contents which are the search objects of the web search engine and the contents which are the search objects of the extraction information generation unit 134 are not necessarily identical completely. That is, the extraction information generation unit 134 can interpret, in an extended manner, the contents which are the search objects of the web search engine. For example, based on a query corresponding to a similar word, a synonym, or a related word of a query indicating contents which are the search objects of the web search engine, the extraction information generation unit 134 may generate extraction information indicating a search object having contents similar or related to the contents which are the search objects of the web search engine.

More specifically, with respect to the search object related to the search ID "C10," the extraction information generation unit 134 generates extraction information by using the reference date and time which are "00:00:00 on Jun. 13, 2014" in the "completion" state. In this case, for example, the extraction information generation unit 134 generates extraction information indicated as extraction information "C10-20140613." The extraction information "C10-20140613" is a behavior history at and before "00:00:00 on Jun. 13, 2014" among the user data with respect to the search ID "C10" which user data is held in the search server 20. Also, the extraction information "C10-20140613" is information to give the web search engine an instruction of extracting a user having a behavior history corresponding to "recent one week, a product "AAA," and a search." In other words, by receiving the extraction information "C10-20140613," the search server 20 searches for a user corresponding to a condition indicated by the extraction information "C10-20140613." Similarly, with respect to the extraction information related to the search ID "C20," the extraction information generation unit 134 uses a reference date and time which are "00:00:00 on Jun. 1, 2014" in the "completion" state. In this case, for example, the extraction information generation unit 134 generates extraction information indicated as extraction information "C20-20140601." The extraction information "C20-20140601" is information to give the web search engine an instruction of extracting a user having attribution information corresponding to "living in Tokyo" at and before "00:00:00 on Jun. 1, 2014" among the user data held in the search server 20.

(Extraction Information Transmission Unit 135)

The extraction information transmission unit 135 transmits extraction information. More specifically, the extraction information transmission unit 135 according to the embodiment transmits the extraction information generated by the extraction information generation unit 134 to each search server 20.

Extraction Result Acquisition Unit 136

The extraction result acquisition unit 136 acquires an extraction result. More specifically, the extraction result acquisition unit 136 according to the embodiment acquires, from the search server 20 which receives the extraction information transmitted from the extraction information transmission unit 135, an extraction result corresponding to the transmitted extraction information. In other words, by making a predetermined web search engine (here, corresponding to search server 20) execute extraction processing based on an arbitrary query received from the information user P1, the extraction result acquisition unit 136 acquires, as an extraction result, the number of users corresponding to the arbitrary query from a behavior history of a user to be processed. For example, based on a query related to setting of a condition of behavior or an attribution of the user, the extraction result acquisition unit 136 acquires the number of users corresponding to the query.

Also, by using extraction information in which a reference date and time are set, the extraction result acquisition unit 136 makes the web search engine extract the number of users, who correspond to extraction information in which a reference date and time are set, from users whose behavior histories at and before the reference date and time are stored. Thus, an extraction result corresponding to the transmitted extraction information is acquired.

Also, by making a plurality of web search engines, which process information related to a distributed behavior history of each user, execute extraction processing based on a common arbitrary query, the extraction result acquisition unit 136 acquires the number of users extracted by each web search engine.

Notification Unit 137

The notification unit 137 notifies an extraction result. More specifically, the notification unit 137 according to the embodiment notifies information, which is related to the number of users corresponding to the arbitrary query received from the information user P1, as the extraction result acquired by the extraction result acquisition unit 136 to the user terminal 10.

Note that when the extraction result acquisition unit 136 receives extraction results from the plurality of search servers 20, the notification unit 137 notifies the combined number of users acquired by the extraction result acquisition unit 136 from the search servers 20.

3. Configuration of Search Server 20

Figure 5:
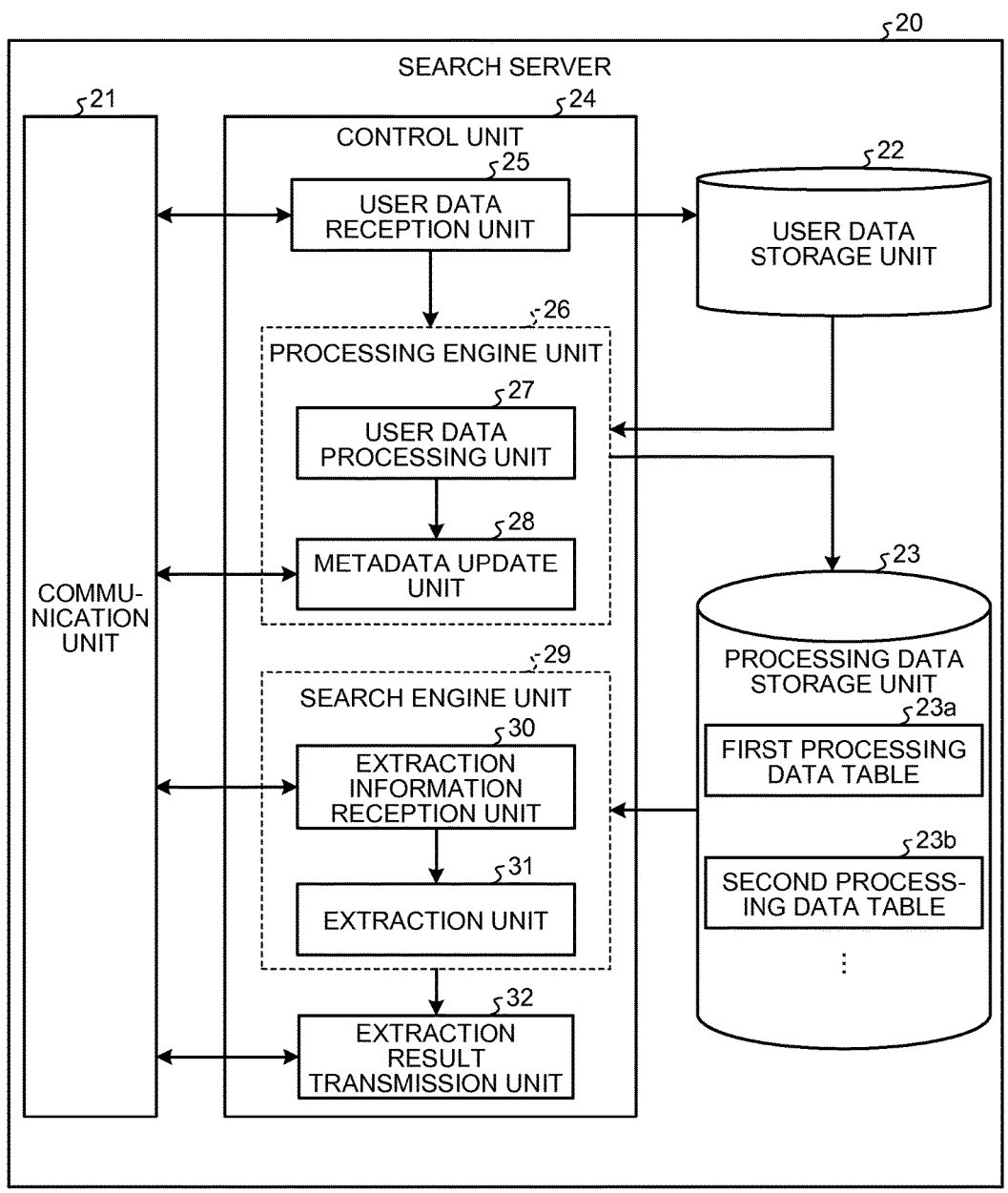
FIG. 5 is a view illustrating a configuration example of a search server according to the embodiment.

Next, with reference to FIG. 5, a configuration of the search server 20 according to the embodiment will be described. FIG. 5 is a view illustrating a configuration example of the search server 20 according to the embodiment. As illustrated in FIG. 5, the search server 20 includes a communication unit 21, a user data storage unit 22, a processing data storage unit 23, and a control unit 24. Note that the search server 20 may include an input unit (such as keyboard or mouse) to receive various operations from an administrator or the like who uses the search server 20 or may include a display unit (such as liquid crystal display) to display various kinds of information.

Communication Unit 21

The communication unit 21 is realized, for example, by an NIC. The communication unit 21 is connected to the network N in a wired or wireless manner and transmits/receives information to/from the extraction device 100 or the metadata server 50 through the network N.

User Data Storage Unit 22

For example, each of the user data storage unit 22 and the processing data storage unit 23 is realized by a semiconductor memory such as a RAM or a flash memory, or a storage device such as a hard disk or an optical disk.

The user data storage unit 22 stores user data. More specifically, the user data storage unit 22 according to the embodiment stores user data distributed, with respect to each user corresponding to the user data, to each search server 20 by the user data server 40.

Here, the user data server 40 will be described. The user data server 40 is a server device to hold the user data. As described above, the user is a person to be an object of the extraction processing in the extraction processing system 1 and is, for example, a person who browses a predetermined website or performs a search on a search site through the network N. User data including a behavior history of such a user is included in a Hypertext transfer protocol cookie (HTTP cookie: hereinafter, simply referred to as "cookie") which is exchanged between an information terminal used by a user and a web server which provides a website. For example, the user data server 40 acquires, from the web server, user identification information or the like included in the cookie and stores a behavior history of each user while associating each user with the behavior history. Note that a method with which the user data server 40 acquires user data is not limited to the above. For example, there is a case where a notification function related to user data which function is realized by a web beacon or the like is embedded in a predetermined website. For example, the web beacon has a function to make an information terminal used by a user, who accesses a web page, access a transparent image or a very small image (also referred to as "clear GIF") stored in the user data server 40. Accordingly, the user data server 40 receives and acquires user data from the information terminal used by the user.

Also, the user data server 40 also holds attribution information or the like of each user. For example, based on contents or the like of user data registered by a user on a portal site provided by an administrator identical or related to an administrator of the user data server 40, the user data server 40 can acquire attribution information such as an age, a gender, or an address of the user. That is, the user data is data including not only behavior information of a user but also attribution information of the user which information is acquired along with behavior of the user.

Then, the user data server 40 distributes the acquired user data to the search servers 20 and makes the search servers 20 process the user data. Note that when distributing the user data to the search servers 20, the user data server 40 performs distribution, with respect to each user indicated by each piece of the user data, to each search server 20. That is, one piece of user data of a certain user is held in the search server $20_1$ and the other piece of the user data of the same user is not held in the search server $20_2$. When pieces of user data indicating the same user are distributed and held in such a manner in the search servers 20, extracted users are overlapped with each other or a user is not extracted appropriately in the extraction processing.

Figure 6:
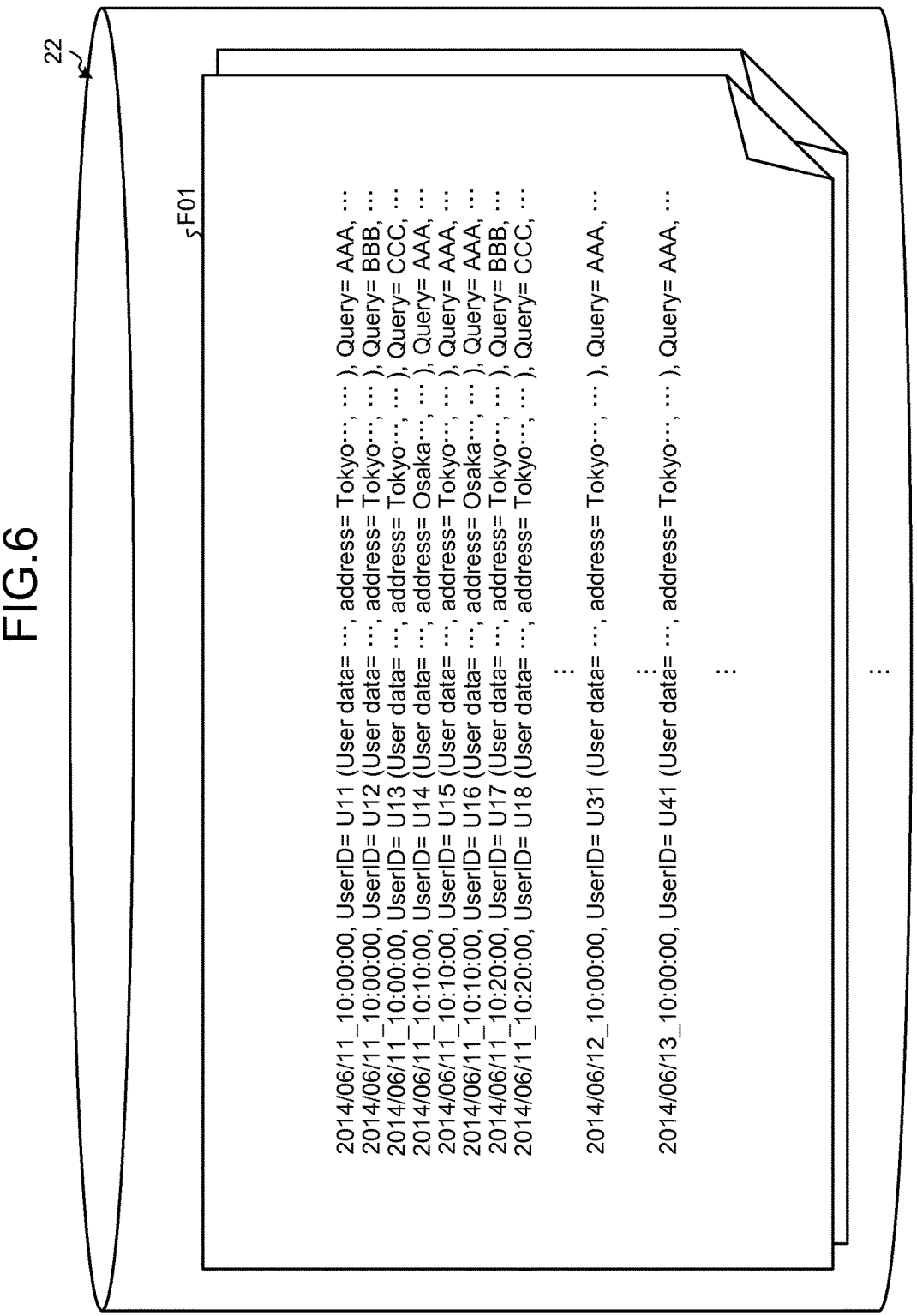
FIG. 6 is a view illustrating an example of a user data storage unit according to the embodiment.

The user data storage unit 22 will be described again. Here, in FIG. 6, an example of the user data storage unit 22 according to the embodiment is illustrated. FIG. 6 is a view illustrating an example of the user data storage unit 22 according to the embodiment. In the example illustrated in FIG. 6, the user data storage unit 22 stores a user data file F01 including an access log having items such as a "date and time of a behavior," a "user ID," "user attribution data," and a "search query."

The "date and time of a behavior" indicates a date and time on which a user uses an information terminal or the like and performs behavior stored in the user data file F01. For example, in the user data file F01, the "date and time of a behavior" is indicated as "2014/06/11_10:00:00." In other words, the "date and time of a behavior" indicates a time and date stored into an access log created when the user executes a search behavior on a predetermined portal site or the like.

The "user ID" is identification information to identify a user. For example, in the user data file F01, the "user ID" is indicated as "UserID=U11." Here, identification of a user can be performed by including user identification information into a cookie exchanged between the information terminal used by the user and a predetermined web server. Also, a method to identify a user is not limited to the above. For example, a special program may be set in the information terminal used by the user and the user identification information may be transmitted from the special program to the user data server 40. Also, since the user data includes attribution information of a user, attribution information of a user is specified for each user ID. For example, in the user data file F01, attribution information of a user is indicated as "User data= . . . " or "Address=Tokyo." Note that the user data storage unit 22 may separately store behavior information of a user and attribution information of the user. In this case, attribution information of the user is not described in the user data file F01 and is stored in a predetermined different data file. In this case, by associating a user ID between files, the search server 20 can associate information of each file with respect to each user.

The "search query" is a character string indicating a search request. Here, a character string which is input in a case where a search is performed by an information terminal used by a user is meant. For example, an arbitrary product name "AAA" or the like used for the search is concerned. For example, as illustrated in FIG. 6, in the user data file F01, the "search query" is indicated as "Query=AAA."

That is, in the user data file F01 illustrated in FIG. 6, it is indicated that an information terminal operated by a user whose user ID is "U11" inputs a search query "AAA" and performs search at "10:00:00 on Jun. 11, 2014."

Note that here, as illustrated in FIG. 6, a search history being included as a behavior history of a user has been described as an example of the user data stored in the user data storage unit 22 according to the embodiment. However, for example, the user data storage unit 22 may store, as an access log, a behavior history indicating purchase of a product or a behavior history indicating that a banner advertisement is clicked instead of a "Query" which is a behavior history. In this case, the user data storage unit 22 creates a new user data file for each type of a behavior history.

Processing Data Storage Unit 23

The processing data storage unit 23 stores processing data which is user data processed into a form suitable for search processing. As illustrated in FIG. 5, the processing data storage unit 23 according to the embodiment includes a first processing data table 23*a* and a second processing data table 23*b*.

The first processing data table 23*a* stores processing data which is user data processed into a form suitable for the search processing. Here, in FIG. 7, an example of the first processing data table 23*a* according to the embodiment is illustrated. In the example illustrated in FIG. 7, the first processing data table 23*a* includes items such as an "extraction information ID" and a "user ID."

The "extraction information ID" indicates identification information for identification of extraction information to extract, from the user data, a user corresponding to a condition. Also, the "user ID" indicates identification information for identification of a user, who corresponds to the extraction information, among the user data.

Figure 7:
FIG. 7 is a view illustrating an example of a first processing data table according to the embodiment.

That is, in FIG. 7, it is indicated that users corresponding to an extraction information ID "C10-20140612" are users with user IDs "U11, U14, U15, and U16." Also, it is indicated that users corresponding to an extraction information ID "C10-20140613" are users with user IDs "U11, U14, U15, U16, and U31." Also, it is indicated that users corresponding to an extraction information ID "C10-20140614" are users with user IDs "U11, U14, U15, U16, U31, U41 . . . " and not all user IDs are in an established state. In other words, user data corresponding to the extraction information ID "C10-20140614" is being read in the search server 20.

As illustrated in FIG. 7, the first processing data table 23*a* includes an extraction information ID which is information to extract a user and has a form of an inverted index in which a user corresponding to extraction information is arranged and stored. Accordingly, the search server 20 can execute search processing at high speed with respect to the data, which is stored in the processing data storage unit 23, by using the web search engine.

Figure 8:
FIG. 8 is a view illustrating an example of a second processing data table according to the embodiment.

In the second processing data table 23*b*, processing data which is user data processed into a form suitable to the search processing is stored. Here, in FIG. 8, an example of the second processing data table 23*b* according to the embodiment is illustrated. As illustrated in FIG. 8, similarly to the first processing data table 23*a*, the second processing data table 23*b* includes items such as an "extraction information ID" and a "user ID."

That is, in FIG. 8, it is indicated that users corresponding to an extraction information ID "C20-20140501" are users with user IDs "U11, U12, U13, U15, U17, U18, U31, and U41." Also, it is indicated that users corresponding to an extraction information ID "C20-20140601" are also the users with the user IDs "U11, U12, U13, U15, U17, U18, U31, and U41." Also, it is indicated that user IDs of all users corresponding to an extraction information ID "C20-20140701" are not yet in an established state.

Control Unit 24

The control unit 24 is realized, for example, when various programs stored in a storage device in the search server 20 are executed by a CPU, an MPU, or the like with a RAM as a working area. Also, the control unit 24 is realized by an integrated circuit such as an ASIC or an FPGA.

As illustrated in FIG. 5, the control unit 24 includes a user data reception unit 25, a processing engine unit 26, a search engine unit 29, and an extraction result transmission unit 32 and realizes or executes a function or an effect of information processing described in the following. Note that an inner configuration of the control unit 24 is not limited to the configuration illustrated in FIG. 5 and may include a different configuration as long as the information processing described later is performed. Also, a connection relation between the processing units included in the control unit 24 is not limited to the connection relation illustrated in FIG. 5 and may be a different connection relation.

User Data Reception Unit 25

The user data reception unit 25 receives user data. More specifically, the user data reception unit 25 according to the embodiment receives user data transmitted from the user data server 40 and stores the received user data into the user data storage unit 22.

Processing Engine Unit 26

The processing engine unit 26 executes processing related to a processing stage of data in the web search engine. As illustrated in FIG. 5, the processing engine unit 26 includes a user data processing unit 27 and a metadata update unit 28.

User Data Processing Unit 27

The user data processing unit 27 performs analysis processing of user data in such a manner that the search engine unit can perform search processing. More specifically, the user data processing unit 27 resolves the user data stored in the user data storage unit 22 into behavior information of a user and attribution information of the user and assigns a search ID to each piece of information. Note that a search ID assigned to the behavior information of the user or the attribution information of the user is in common with the search ID assigned by the query analysis unit 133 according to the extraction device 100.

Here, an example in which the user data processing unit 27 processes user data stored in the user data file F01 in the user data storage unit 22 illustrated in FIG. 6 will be described. In a case of processing data related to the user U11, the user data processing unit 27 assigns a search ID "C10" to a behavior history corresponding to "recent one week, a product "AAA," and a search" based on a date and time of behavior and an item of a search query. Also, the user data processing unit 27 analyzes attribution information included in the user U11. Then, since the user U11 includes attribution information indicated by "address=Tokyo," the user data processing unit 27 assigns a search ID "C20" indicating "living in Tokyo." In such a manner, the user data processing unit 27 assigns a corresponding search ID to user data indicating behavior of each of different users U12, U13, U14 . . . .

Then, the user data processing unit 27 stores the processed user data and an extraction information ID into the first processing data table 23a and the second processing data table 23b while associating the two to each other. An extraction information ID in this case is information to identify the extraction information generated by including a reference date and time illustrated, for example, in FIG. 4 into a search ID. That is, the user data processing unit 27 detects a user ID satisfying both of a search ID and a reference date and time. Then, the user data processing unit 27 stores the detected user ID while associating the user ID with an extraction information ID. For example, in FIG. 6, the user U11 performs search behavior at "10:00:00 on Jun. 11, 2014." In this case, the user U11 is a user who satisfies the search ID "C10" at a time point of a reference date and time "00:00:00 on Jun. 12, 2014." In other words, the user U11 corresponds to a user who "executes search for a product "AAA" within recent one week" at a time point of a reference date and time "00:00:00 on Jun. 12, 2014." Here, in the first processing data table 23a, the user U11 is arranged as a user corresponding to the extraction information ID "C10-20140612." Also, the user U11 is a user who satisfies the search ID "C10" also at a time point of a reference date and time "00:00:00 on Jun. 13, 2014" and a reference date and time "00:00:00 on Jun. 14, 2014." Thus, as illustrated in FIG. 7, in the first processing data table 23a, the user U11 is also arranged as a user corresponding to the extraction information ID "C10-20140613" and the extraction information ID "C10-20140614." The user data processing unit 27 executes the above processing with respect to the user data continually received by the user data reception unit 25. In such a manner, the user data processing unit 27 generates each processing data table as an inverted index of each piece of user data. Then, the user data processing unit 27 stores the generated data table into the processing data storage unit 23.

Metadata Update Unit 28

The metadata update unit 28 updates metadata related to the user data. More specifically, the metadata update unit 28 according to the embodiment generates metadata, which indicates that reading processing of user data is completed, at a time point at which analysis processing executed by the user data processing unit 27 is completed. Then, the metadata update unit 28 accesses the metadata server 50 and transmits the generated metadata, whereby the stored metadata is updated. For example, it is assumed that the user data processing unit 27 completes reading of user data which is related to the search ID "C10" and to "Jun. 12, 2014." In this case, the metadata update unit 28 updates, into "completion," a state of metadata which corresponds to the search ID "C10" and to a reference date and time "00:00:00 on Jun. 13, 2014" and which is in a "reading" state.

Note that the metadata update unit 28 updates, with respect to metadata indicating a storage place of user data, data in the metadata storage unit 51. Accordingly, it is possible to identify which search server 20 holds user data distributed from the user data server 40. Also, it is possible to identify which search server 20 executes extraction processing or the like.

Search Engine Unit 29

The search engine unit 29 executes processing related to a search for data in the web search engine. As illustrated in FIG. 5, the search engine unit 29 includes an extraction information reception unit 30 and an extraction unit 31.

Extraction Information Reception Unit 30

The extraction information reception unit 30 receives an arbitrary query in the extraction processing. More specifically, the extraction information reception unit 30 according to the embodiment receives, as an arbitrary query, extraction information transmitted from the extraction information transmission unit 135 according to the extraction device 100. Note that the arbitrary query received by the extraction information reception unit 30 is not necessarily identical to the query which is transmitted by the information user P1 to the extraction device 100. Here, the arbitrary query means a character string indicating a request (inquiry) to be a cue of the extraction processing in the web search engine. That is, the extraction information reception unit 30 receives, as an arbitrary query which is a request to be a cue of the search processing, extraction information transmitted from the extraction information transmission unit 135 according to the extraction device 100.

Extraction Unit 31

The extraction unit 31 extracts data corresponding to a predetermined condition, which is indicated by an arbitrary query, among data to be processed. More specifically, the extraction unit 31 according to the embodiment extracts, among users whose behavior histories are stored in the processing data storage unit 23, the number of users corresponding to an arbitrary query received by the extraction information reception unit 30 (that is, extraction information received by extraction information reception unit 30). For example, when the received extraction information is "C10-20140613" and "C20-20140601," the extraction unit 31 extracts, as a search result, a user corresponding to each piece of extraction information. That is, as illustrated in FIG. 7, the extraction unit 31 searches for the user IDs "U11, U14, U15, U16, and U31" with respect to the received extraction information "C10-20140613." Also, as illustrated in FIG. 8, the extraction unit 31 searches for the user IDs "U11, U12, U13, U15, U17, U18, U31, and U41" with respect to the received extraction information "C20-20140601." Then, the extraction unit 31 extracts the user IDs "U11, U15, and U31" common to both search results. In this case, the extraction unit 31 calculates, as an extraction result with respect to the received extraction information, "3" which is the number of corresponding users.

Extraction Result Transmission Unit 32

The extraction result transmission unit 32 transmits an extraction result. More specifically, the extraction result transmission unit 32 according to the embodiment transmits the number of users corresponding to the extraction information to the extraction device 100 as a result of execution of the extraction processing by the extraction unit 31 with respect to the extraction information received by the extraction information reception unit 30.

4. Extraction Processing Procedure

Figure 9:
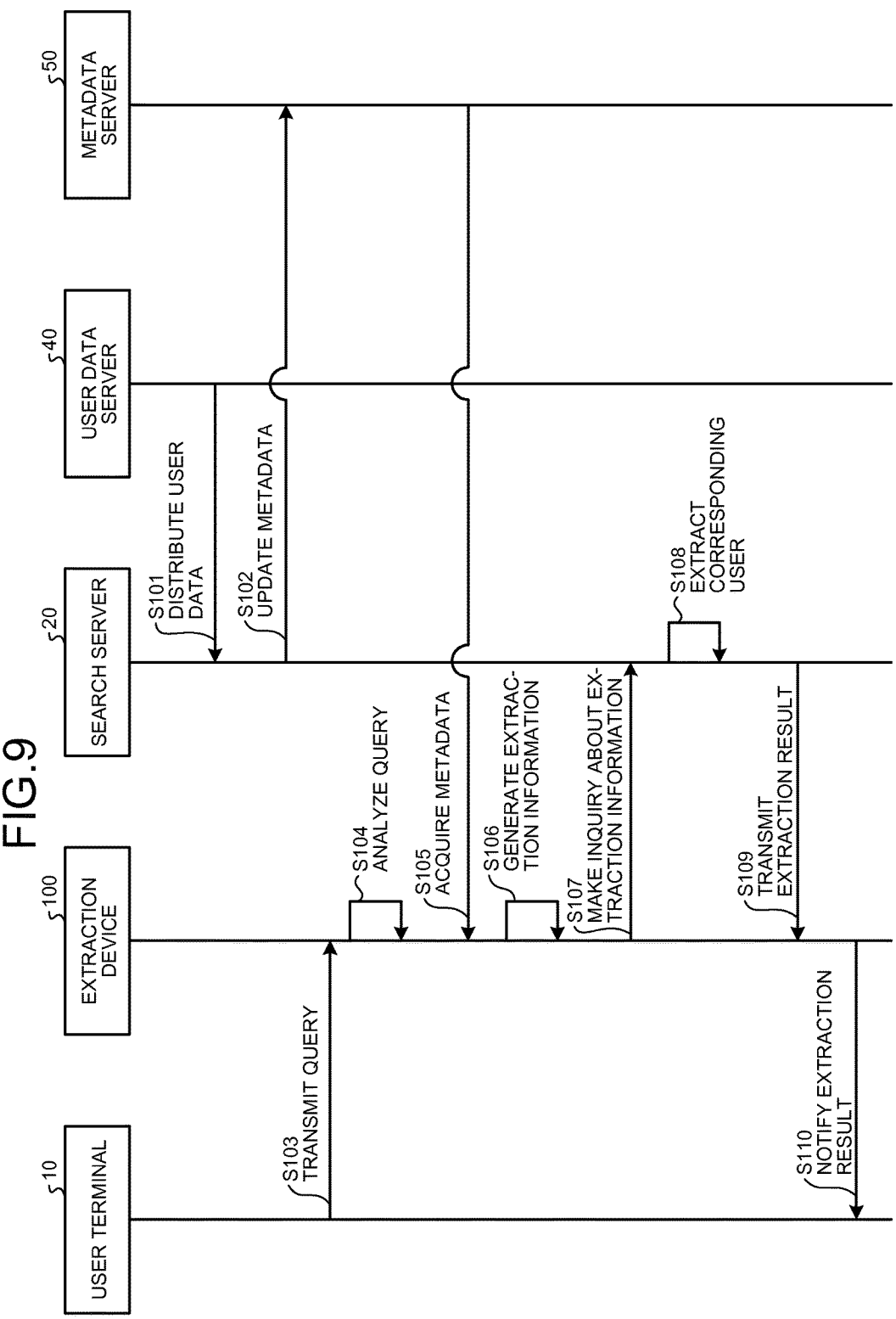
FIG. 9 is a sequence diagram illustrating an extraction processing procedure according to an extraction processing system according to the embodiment.

Next, a procedure of the extraction processing performed by the extraction processing system 1 according to the embodiment will be described with reference to FIG. 9. FIG. 9 is a sequence diagram illustrating an extraction processing procedure by the extraction processing system 1 according to the embodiment.

As illustrated in FIG. 9, the user data server 40 distributes user data to the search server 20 (step S101). Then, with respect to metadata of user data indicating that reading of the user data is completed, the search server 20 updates metadata stored in the metadata server 50 (step S102).

Then, the user terminal 10 transmits a query corresponding to a condition of a user, extraction of whom is intended by the information user P1, to the extraction device 100 (step S103). The extraction device 100 analyzes the received query (step S104). Also, the extraction device 100 acquires metadata corresponding to a search ID of each analyzed query from the metadata server 50 (step S105).

Then, the extraction device 100 generates extraction information based on a search ID and metadata (step S106). Subsequently, the extraction device 100 makes an inquiry to the search server 20 about extraction information in order to search for a user corresponding to the extraction information (step S107).

Then, the search server 20 which receives the extraction information extracts a user corresponding to the extraction information (step S108). Subsequently, the search server 20 transmits the extraction result to the extraction device 100 (step S109). Then, the extraction device 100 transmits a result, which is a combination of extraction results received from the search servers 20, as the extraction result to the user terminal 10 (step S110).

5. Extraction Processing Procedure by Extraction Device

Figure 10:
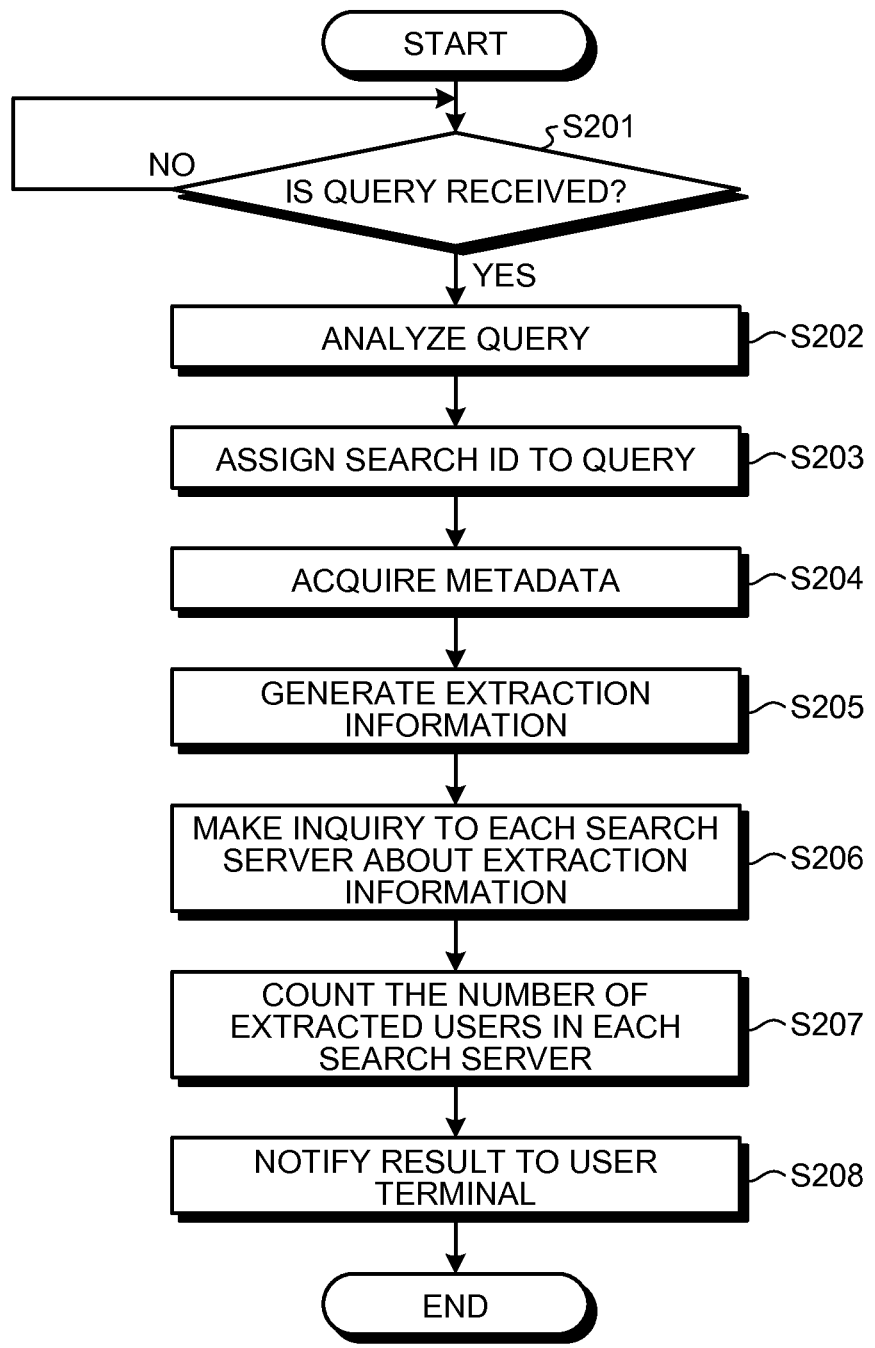
FIG. 10 is a flowchart illustrating an extraction processing procedure by the extraction device according to the embodiment.

Next, with reference to FIG. 10, a procedure of the extraction processing performed by the extraction device 100 according to the embodiment will be described with reference to FIG. 10. FIG. 10 is a flowchart illustrating the extraction processing procedure by the extraction device 100 according to the embodiment.

As illustrated in FIG. 10, the extraction device 100 determines whether a query is received from the user terminal 10 (step S201). Then, when no query is received (step S201; No), the extraction device 100 waits until a query is received.

On the other hand, when receiving a query from the user terminal 10 (step S201; Yes), the extraction device 100 analyzes the received query (step S202).

Then, the extraction device 100 assigns a search ID to each kind of contents to be a search object with respect to the analyzed query (step S203). Subsequently, the extraction device 100 acquires metadata from the metadata server 50 (step S204). Then, the extraction device 100 generates extraction information based on the search ID and the acquired metadata (step S205).

Subsequently, the extraction device 100 makes an inquiry to each search server 20 about the extraction information (step S206). That is, the extraction device 100 makes each search server 20 execute the extraction processing. Then, the extraction device 100 counts, as a processing result, the extracted number of users of each search server 20 (step S207). Then, the extraction device 100 notifies the extraction result to the user terminal 10 (step S208).

6. Modification Example

The above-described embodiment may be embodied in various forms different from the above embodiment. Thus, in the following, a different embodiment will be described.

6-1. Metadata

As illustrated in FIG. 4, in the above-described embodiment, an example in which the search server 20 updates metadata each time reading of user data is completed has been described. Here, in a state of the metadata, latest user data is not necessarily in a "completion" state at all times.

For example, a metadata update unit 28 can update a state of arbitrary metadata. When a state of metadata is updated, an updated reference date and time are set as a reference date and time in extraction information generated by the extraction information generation unit 134. Accordingly, for example, in a case where there is an error in latest update data of user data and when extraction processing is to be performed by discarding the latest update data and by using previous user data, the extraction processing system 1 can operate flexibly.

Also, the extraction information generation unit 134 does not necessarily generate extraction information by setting a reference date and time, which are in a "completion" state, in metadata at all times. For example, there may be a case where an information user intends extraction of a user having a predetermined behavior history at a previous time point. In this case, the extraction information generation unit 134 can generate extraction information by setting a reference date and time even when the reference date and time is in an "end" state in the metadata. In such a manner, the extraction device 100 can respond to an intention of the information user flexibly.

Note that as illustrated in FIG. 4, in the above-described embodiment, an example in which update timing of a reference date and time of the search ID "C10" is in every 24 hours has been described. However, the metadata update unit 28 may set update timing of a reference date and time in shorter or longer intervals. By shortening intervals of update timing of a reference date and time, the metadata update unit 28 can extract a user corresponding to a newer behavior history.

6-2. Correlation of User Data

In the above-described embodiment, an example in which the search engine unit 29 according to the search server 20 extracts a user corresponding to extraction information has been described. Here, the search engine unit 29 may extract the number of users related to extraction information.

For example, it is assumed that contents related to a search object are "recent one week, a query "baseball", and a search." In this case, the search engine unit 29 extracts a user who searches for the query "baseball" in recent one week before a reference date and time. Here, it is assumed that a query "soccer" is associated to the query "baseball." In this case, the search engine unit 29 extracts not only the number of users corresponding to the search object "recent one week, a query "baseball," and a search" but also the number of users corresponding to a search object "recent one week, a query "soccer," and a search."

That is, the extraction device 100 can make the search server 20 execute a search with contents, which are related to an arbitrary query posted by the information user P1, as a search object. Accordingly, the extraction device 100 can simultaneously provide, to the information user P1, a result with respect to a condition related to a condition input by the information user P1. Thus, it is possible to improve convenience of when the information user P1 uses the extraction processing system 1.

6-3. Web Search Engine

In the above-described embodiment, an example in which the search server 20 searches for user data and extracts a user corresponding to a condition by using a web search engine has been described. Also, an example in which the search server 20 generates an inverted index illustrated, for example, in FIG. 7 and FIG. 8 and uses the generated data table has been described. Also, an example in which a web search engine included in the search server 20 corresponds to the processing engine unit 26 or the search engine unit 29 and a search is executed by using an inverted index illustrated, for example, in FIG. 7 and FIG. 8 has been described.

As described above, the web search engine according to the embodiment is a web search engine which collects information of a page on a web by using a robot (program) called a "crawler" or a "spider" (for example, corresponding to processing executed by user data server 40), which performs creation, registration, and update of information to be registered into an index based on the collected data (for example, corresponding to processing executed by processing engine unit 26), and which extracts data corresponding to a query transmitted from the information user P1 among data registered in the index (for example, corresponding to processing executed by search engine unit 29).

That is, the web search engine according to the above-described embodiment executes processing of reading user data by a reading method other than the RDB or the KVS. For example, the web search engine according to the embodiment is different from the RDB method and can dynamically add, delete, or change information, which is related to a behavior history of a user, with respect to user data to be processed. More specifically, the extraction result acquisition unit 136 according to the extraction device 100 makes a search engine execute extraction processing as a web search engine, the search engine generating an inverted index with respect to information related to a behavior history of a user and extracting a user corresponding to an arbitrary query, which is received from the information user P1, by using the inverted index.

Note that the web search engine used by the search server 20 in the extraction processing is not limited to a processing method described in the embodiment. That is, the web search engine used by the search server 20 only needs to be an extraction unit (such as program to operate on server device) which receives an arbitrary query in one or both of a natural sentence and a logical formula with respect to user data to be processed and extracts the number of users corresponding to a condition indicated by the received query. That is, the web search engine according to the embodiment does not necessarily include the processing engine unit 26, the extraction result transmission unit 32, and the like. For example, only the search engine unit 29 which executes search processing with respect to the received query or the extraction unit 31 included in the search engine unit 29 may be considered as a web search engine. Also, as illustrated in FIG. 5, in the above-described embodiment, an example in which the search server 20 includes the processing engine unit 26, the search engine unit 29, and the extraction result transmission unit 32 separately has been described. However, a search server 20 may include a web search engine unit in which a processing engine unit 26, a search engine unit 29, and an extraction result transmission unit 32 are integrated. In this case, the web search engine unit according to the search server 20 functions as a so-called existing web search engine and executes processing to extract a search object corresponding to a query. That is, the web search engine unit includes an extraction unit and a transmission unit. The extraction unit sets user data received by a user data reception unit 25 as an object of processing, uses a predetermined web search engine (corresponding to all or a part of processing engine unit 26 and search engine unit 29) based on an arbitrary query received from an extraction device 100, and extracts the number of users corresponding to the arbitrary query from users whose behavior histories are stored in a processing data storage unit 23. The transmission unit transmits the number of users extracted by the extraction unit to a transmission source of the arbitrary query.

Also, a so-called existing web search engine includes a structure to output search results in order of priority with respect to a query. On the other hand, a purpose of a web search engine used by the search server 20 according to the embodiment is to count the number of users including a behavior history to be a search object. Thus, results are not necessarily output in order of likelihood. In such a manner, the web search engine according to the above-described embodiment is not limited to a structure or a design of an existing web search engine and includes a web search engine in which a function or a search method is adjusted according to an object to be processed.

6-4. Query

In the above-described embodiment, an example in which the extraction device 100 derives contents of a search object by receiving an arbitrary query from the user terminal 10 and analyzing the received query has been described. As described above, the arbitrary query is displayed, for example, as an arbitrary text. The extraction device 100 analyses contents of the received text into a form which can be processed by the web search engine by executing morphological analysis with respect to the received text.

However, an extraction device 100 may not receive an arbitrary query as a text and may receive a query related to extraction processing, for example, by providing a predetermined user interface. In this case, in the user interface, a space to input an attribution of a user to be a search object, a period to be a search object, a behavior history to be a search object, and the like is previously provided. By inputting a condition into the user interface, an information user P1 presents a search condition to the extraction device 100. According to the input condition, the extraction device 100 generates extraction information in such a manner that processing can be performed by the web search engine.

In such a manner, the extraction device 100 may receive a query form the information user P1 in various forms. For example, by providing the user interface, the extraction device 100 omits time and effort of analyzing an arbitrary text. Thus, a speed of processing can be increased.

6-5. Other

Also, all or a part of the processing, which has been described to be performed automatically, among the processing described in the above-described embodiment can be performed manually. Alternatively, all or a part of the processing described to be performed manually can be performed automatically by a known method. Also, a processing procedure, a specific name, and information including various kinds of data or parameters which procedure, name, and information are described in the document or the drawing can be changed arbitrarily when not being noted specifically. For example, various kinds of information illustrated in each drawing are not limited to the illustrated information.

Also, each configuration element of each illustrated device is function-conceptual and is not necessarily configured physically in a manner illustrated in the drawing. That is, a detail form of separation/integration of each device is not limited to what has been illustrated and all or a part thereof can be configured in a manner functionally or physically separated/integrated in an arbitrary unit according to various loads or usage conditions.

For example, the search ID storage unit 120 illustrated in FIG. 2 may not be held by the extraction device 100 and may be held by a storage server or the like (not illustrated). In this case, the extraction device 100 acquires information such as a search ID from the storage server.

Also, in the above embodiment, an example in which the extraction device 100 provides an extraction service has been described. However, a subject to provide the extraction service may be a different server device. Also, for example, the above-described extraction device 100 may be separated into a reception device including a query reception unit 131, an extraction device including a search access unit 132, and a notification device including a notification unit 137. Also, for example, the above-described search server 20 may be separated into an information processing device including a user data reception unit 25, a processing engine unit 26, and an extraction result transmission unit 32 and a search device including a search engine unit 29. In this case, the information processing device may be an information processing device to control a predetermined web search engine (such as search device including extraction unit 31). That is, the information processing device receives user data from the user data server 40 and performs conversion processing of the received user data into a form in which the processing can be executed by a predetermined web search engine. Also, in this case, the information processing device may further include an acquisition unit which makes a predetermined web search engine execute extraction processing and which acquires, as an extraction result, the number of users corresponding to an arbitrary query among users whose behavior histories are stored in the processing data storage unit 23. In this case, the extraction result transmission unit 32 according to the information processing device transmits the number of users acquired by the acquisition unit to the extraction device 100.

7. Hardware Configuration

Figure 11:
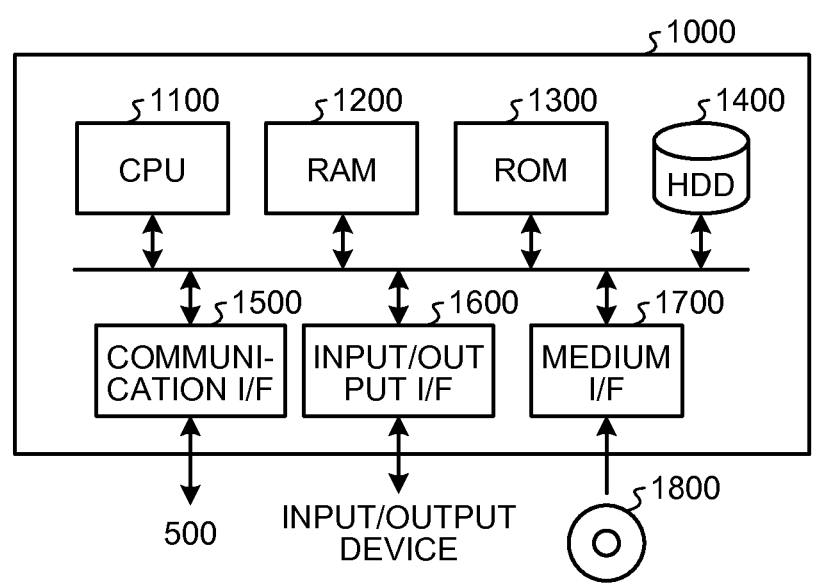
FIG. 11 is a hardware configuration view illustrating an example of a computer to realize a function of the extraction device.

Also, the extraction device 100 according to the above-described embodiment is realized by a computer 1000 having a configuration illustrated, for example, in FIG. 11. In the following, an example of the extraction device 100 will be described. FIG. 11 is a hardware configuration view illustrating an example of the computer 1000 which realizes a function of the extraction device 100. The computer 1000 includes a CPU 1100, a RAM 1200, a ROM 1300, an HDD 1400, a communication interface (I/F) 1500, an input/output interface (I/F) 1600, and a medium interface (I/F) 1700.

The CPU 1100 operates based on a program stored in the ROM 1300 or the HDD 1400 and controls each unit. The ROM 1300 stores a boot program executed by the CPU 1100 in activation of the computer 1000, a program depending on hardware of the computer 1000, and the like.

The HDD 1400 stores a program executed by the CPU 1100, data used by the program, and the like. The communication interface 1500 receives data from a different device through a communication network 500 (corresponding to network N) and transmits the data to the CPU 1100. Also, the communication interface 1500 transmits data generated by the CPU 1100 to a different device through the communication network 500.

The CPU 1100 controls an output device such as a display or a printer and an input device such as a keyboard or a mouse through the input/output interface 1600. The CPU 1100 acquires data from the input device through the input/output interface 1600. Also, the CPU 1100 outputs the generated data to the output device through the input/output interface 1600.

The medium interface 1700 reads a program, such as an extraction program, or data stored in a storage medium 1800 which is an example of a non-transitory computer readable storage medium and provides the read program or data to the CPU 1100 through the RAM 1200. The CPU 1100 loads the program from the storage medium 1800 into the RAM 1200 through the medium interface 1700 and executes the loaded program. The storage medium 1800 is, for example, an optical storage medium such as a digital versatile disc (DVD) or a phase change rewritable disk (PD), a magneto-optical storage medium such as a magneto-optical disk (MO), a tape medium, a magnetic recording medium, or a semiconductor memory.

For example, when the computer 1000 functions as the extraction device 100 according to the embodiment, the CPU 1100 of the computer 1000 realizes a function of the control unit 130 by executing the program loaded in the RAM 1200. Also, the HDD 1400 stores data in the search ID storage unit 120. The CPU 1100 of the computer 1000 reads the program from the storage medium 1800 and executes the program. However, in a different example, the program may be acquired from a different device through the communication network 500.

8. Effect

As described above, the extraction device 100 according to the embodiment includes the extraction result acquisition unit 136 (example of acquisition unit) and the notification unit 137. By making a predetermined web search engine execute extraction processing based on an arbitrary query received from the information user P1, the extraction result acquisition unit 136 acquires, as an extraction result, the number of users corresponding to the arbitrary query among users whose behavior histories are stored in a predetermined storage unit. The notification unit 137 notifies the number of users acquired by the extraction result acquisition unit 136 to the information user P1 who transmits the arbitrary query.

In such a manner, the extraction device 100 according to the embodiment can extract a user corresponding to a condition, which is intended by the information user P1, at high speed by using an existing web search engine with respect to the user data to be processed. Thus, according to the extraction device 100 of the embodiment, the information user P1 can use user data flexibly.

Also, the extraction device 100 according to the embodiment includes an extraction information generation unit 134 (example of generation unit). The extraction information generation unit 134 generates extraction information which is information with which the web search engine specifies an object to be extracted. Then, the extraction result acquisition unit 136 makes the web search engine execute extraction processing by using the extraction information generated by the extraction information generation unit 134.

In such a manner, the extraction device 100 according to the embodiment can extract a user by using extraction information generated according to a condition set freely by the information user P1 compared to information compiled into a database by a system such as the RDB or the KVS. Thus, according to the extraction device 100 of the embodiment, user data can be used flexibly.

Also, based on metadata related to a behavior history, the extraction information generation unit 134 generates extraction information in which a reference date and time are set, the reference date and time being a reference with which the web search engine determines whether a behavior history is a behavior history to be a search object. By using the extraction information in which the reference date and time are set, the extraction result acquisition unit 136 makes the web search engine extract the number of users corresponding to an arbitrary query among users whose behavior histories at and before the reference date and time are stored.

Accordingly, the extraction device 100 according to the embodiment can execute extraction processing suitable to a state of data held by the search server 20. Thus, a user corresponding to an intention of the information user P1 can be extracted appropriately.

Also, based on metadata related to a behavior history, the extraction information generation unit 134 generates extraction information indicating an identical or similar search object from a query indicating contents identical or similar to contents of a search object of the web search engine. The extraction result acquisition unit 136 makes the web search engine execute extraction processing by using extraction information generated by the extraction information generation unit 134.

In such a manner, since the search server 20 generates extraction information consistent with data processed as a search object, the extraction device 100 according to the embodiment can make the web search engine execute the extraction processing appropriately.

Also, by making a plurality of web search engines, which processes information related to a behavior history of a user which information is distributed with respect to each user, execute extraction processing based on a common arbitrary query, the extraction result acquisition unit 136 acquires the number of users extracted by each web search engine. The notification unit 137 notifies the combined number of users acquired by the extraction result acquisition unit 136.

In such a manner, the extraction device 100 according to the embodiment can make the plurality of search engines execute extraction processing, whereby the number of users can be extracted at high speed.

Also, based on a query related to setting of a condition about behavior or an attribution of a user, the extraction result acquisition unit 136 acquires, as an extraction result, the number of users corresponding to the query.

In such a manner, the extraction device 100 according to the embodiment can extract a user in response to a specific intention of the information user P1.

Also, the extraction result acquisition unit 136 makes a search engine execute extraction processing as a web search engine, the search engine generating an inverted index with respect to information related to a behavior history of a user and extracting a user corresponding to an arbitrary query received from the information user P1 by using the inverted index.

Accordingly, the extraction device 100 according to the embodiment can extract a user at high speed under flexible condition setting compared to the information compiled into a database by a system such as the RDB or the KVS.

Also, the search server 20 according to the embodiment includes a web search engine unit (including processing engine unit 26 and search engine unit 29) and an extraction result transmission unit 32 (example of transmission unit). The web search engine unit includes an extraction information reception unit 30 which receives extraction information as an arbitrary query and an extraction unit 31 which extracts the number of users corresponding to the arbitrary query, among users whose behavior histories are stored in a predetermined storage unit, based on the arbitrary query received by the extraction information reception unit 30. The extraction result transmission unit 32 transmits the number of users extracted by the extraction unit 31 to a transmission source of the arbitrary query.

In such a manner, the search server 20 according to the embodiment can extract the number of users in response to an intention of the information user P1 flexibly.

Also, the information processing device according to the embodiment includes an acquisition unit and a transmission unit. By making a predetermined web search engine (for example, corresponding to extraction unit 31) execute extraction processing, the acquisition unit acquires, as an extraction result, the number of users corresponding to an arbitrary query transmitted from the extraction device 100, which receives the arbitrary query from the information user P1, among users whose behavior histories are stored in a predetermined storage unit. The transmission unit transmits, to the extraction device 100, the number of users acquired by the acquisition unit.

In such a manner, by controlling a web search engine, the information processing device according to the embodiment can extract the number of users corresponding to an arbitrary query according to a request from the extraction device 100.

Also, an extraction processing system 1 according to the embodiment includes a web search engine unit according to a search server 20, and an extraction device 100. The web search engine unit includes an extraction information reception unit 30 to receive an arbitrary query from the extraction device 100, an extraction unit 31 to extract the number of users corresponding to the arbitrary query received by the extraction information reception unit 30 among users whose behavior histories are stored in a predetermined storage unit, and an extraction result transmission unit 32 to transmit, to the extraction device 100, the number of users extracted by the extraction unit 31. The extraction device 100 includes an extraction information transmission unit 135 to transmit the arbitrary query received from the information user P1 to the search server 20, the extraction result acquisition unit 136 to acquire the number of users transmitted as an extraction result by the extraction result transmission unit 32, and a notification unit 137 to notify the number of users acquired by the extraction result acquisition unit 136 to the information user P1 who transmits the arbitrary query.

In such a manner, the extraction processing system 1 according to the embodiment transmits back the number of users in response to a free intension of the information user P1. Thus, the information user P1 can use user data flexibly.

In the above, some embodiments of the present application have been described in detail with reference to the drawings. However, these are examples and the present invention can be embodied not only in a form described in the disclosure of the invention but also in a different form in which various modifications and improvements are made based on knowledge of those skilled in the art.

Also, the above-described "unit" can be also referred to as "means" or a "circuit." For example, the notification unit can be referred to as notification means or a notification circuit.

According to a mode of the embodiment, user data can be used flexibly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraction device comprising:
   a memory storing user data of a plurality of users, each user data including at least behavior histories of the plurality of users;
   a processor operatively coupled to the memory, the processor being programmed to:
      acquire behavior history information from a plurality of search servers that receive search queries from the plurality of users;
      update the memory with the acquired behavior history information from the plurality of search servers;
      receive a query from an information user indicating parameters of a search to be performed on the acquired and updated behavior history information stored in the memory at a most recent acquisition and update of the memory;
      acquire metadata from a metadata server including date and time information, which indicates an embedded date and time of completion of updating a most recent acquisition of behavior history information and a most recent update of the memory;
      set a reference date and time as the date and time of the completion of updating the most recent acquisition and updating the memory, the reference date and time identifying a completion state of the stored behavior history information in the memory to be used during extraction processing;
      control a web search engine to execute extraction processing based on the received query parameters and based on the set reference date and time, which is a date and time different than a date and time of receiving the query, the set reference date and time determining that one or more of the stored behavior histories of the plurality of users is a target of a search by the web search engine, the extraction processing being performed on the completion state of the stored behavior history information corresponding to the set reference date and time;
      acquire, as an extraction result, the number of users corresponding to the received query among the plurality of users; and
      notify the acquired number of users to the information user that transmitted the query.

2. The extraction device according to claim 1, wherein the processor is programmed to:
   generate extraction information, which is information with which the web search engine specifies an object to be extracted;
   and make the web search engine execute the extraction processing by using the generated extraction information.

3. The extraction device according to claim 2, wherein the processor is programmed to:
   generate the extraction information in which the reference date and time are set, the reference date and time being a reference with which the web search engine determines whether one of the stored behavior histories is a behavior history to be the search object based on metadata related to the behavior history;
   and make the web search engine extract the number of users corresponding to the received query, by using the extraction information, among the plurality of users having behavior histories at and before the reference date and time are stored.

4. The extraction device according to claim 2, wherein the processor is programmed to:
   generate, based on metadata related to the stored behavior histories, extraction information indicating an identical or similar search object from the query indicating contents identical or similar to contents of the search object of the web search engine;
   and make the web search engine execute the extraction processing by using the generated extraction information.

5. The extraction device according to claim 1, wherein the processor is programmed to:
   make a plurality of web search engines, which process information related to the stored behavior histories of the plurality of users; execute the extraction processing based on a common query and acquire the number of users extracted by each web search engine;
   and notify the combined number of users.

6. The extraction device according to claim 1, wherein the processor is programmed to acquire, based on the query that is related to setting of a condition about behavior or an attribution of the information user, the number of users corresponding to the query.

7. The extraction device according to claim 1, wherein the processor is programmed to make a search engine execute the extraction processing as the web search engine, the search engine generating an inverted index with respect to information related to a behavior history of one of the plurality of users and extracting a user corresponding to the query, which is received from the information user, by using the inverted index.

8. A search server comprising:
   a processor operatively coupled to a memory, the processor being programmed to:
      transmit behavior history information based on search queries from the plurality of users in order to update the memory;

receive a query from an information user indicating parameters of a search to be performed on the updated behavior history information stored in the memory at a most recent acquisition and update of the memory;

acquire metadata from a metadata server including date and time information, which indicates an embedded date and time of completion of updating a most recent acquisition of behavior history information and a most recent update of the memory;

set a reference date and time as the date and time of the completion of updating the most recent acquisition and updating the memory, the reference date and time identifying a completion state of the stored behavior history information in the memory to be used during extraction processing;

extract a number of users corresponding to the received query among a plurality of users having behavior histories are stored in the memory based on the received query parameters and based on the set reference date and time, which is a date and time different than a date and time of receiving the query, the set reference date and time determining that one or more of the stored behavior histories of the plurality of users is a target of a search, the extraction processing being performed on the completion state of the stored behavior history information corresponding to the set reference date and time; and transmit the extracted number of users to a transmission source of the query.

9. An information processing device comprising:
a processor programmed to:
   acquire behavior history information from a plurality of search servers that receive search queries from the plurality of users;
   update the memory with the acquired behavior history information from the plurality of search servers;
   acquire metadata from a metadata server including date and time information, which indicates an embedded date and time of completion of updating a most recent acquisition of behavior history information and a most recent update of the memory;
   set a reference date and time as the date and time of the completion of updating the most recent acquisition and updating the memory, the reference date and time identifying a completion state of the stored behavior history information in the memory to be used during extraction processing;
   control a web search engine to execute extraction processing based on the set reference date and time, which is a date and time different than a date and time of receiving a query by an extraction device, the query indicating parameters of a search to be performed on the acquired and updated behavior history information stored in the memory at the most recent acquisition and update of the memory, the set reference date and time determining that one or more stored behavior histories of the plurality of users is a target of a search by the web search engine, the extraction processing being performed on the completion state of the stored behavior history information corresponding to the set reference date and time;
   acquire, as an extraction result, the number of users among the plurality of users having behavior histories corresponding to the received query, which is transmitted from the extraction device configured to receive the query from an information user; and
   transmit the acquired number of users to the extraction device.

10. An extraction system comprising:
a search server; and
an extraction device, wherein:
   the search server includes a processor programmed to: (i) transmit behavior history information based on search queries from the plurality of users in order to update a memory, (ii) receive a query from the extraction device, the query indicating parameters of a search to be performed on the updated behavior history information stored in the memory at a most recent acquisition and update of the memory, (iii) acquire metadata from a metadata server including date and time information, which indicates an embedded date and time of completion of updating a most recent acquisition of behavior history information and a most recent update of the memory, (iv) set a reference date and time as the date and time of the completion of updating the most recent acquisition and updating the memory, the reference date and time identifying a completion state of the stored behavior history information in the memory to be used during extraction processing, (v) extract, based on the received query parameters and based on the set reference date and time, the number of users corresponding to the query among a plurality of users having behavior histories stored in the memory of the extraction device, the set reference date and time being a date and time different than a date and time of receiving the query by the extraction device, the set reference date and time determining that one or more of the stored behavior histories of the plurality of users is a target of a search by a web search engine, the extracting being performed on the completion state of the stored behavior history information corresponding to the set reference date and time, and (vi) transmit the extracted number of users to the extraction device, and
   the extraction device includes a processor programmed to: (i) transmit, to the search server, the query received from an information user, (ii) acquire the number of users transmitted as an extraction result, and (iii) notify the acquired number of users to the information user that transmits the query.

11. An extraction method executed by a computer, the extraction method comprising:
   acquiring behavior history information from a plurality of search servers that receive search queries from the plurality of users;
   updating a memory with the acquired behavior history information from the plurality of search servers;
   receiving a query from an information user indicating parameters of a search to be performed on the acquired and updated behavior history information stored in the memory at a most recent acquisition and update of the memory;
   acquiring metadata from a metadata server including date and time information, which indicates an embedded date and time of completion of updating a most recent acquisition of behavior history information and a most recent update of the memory;
   setting a reference date and time as the date and time of the completion of updating the most recent acquisition and updating the memory, the reference date and time identifying a completion state of the stored behavior history information in the memory to be used during extraction processing;

controlling a web search engine to execute extraction processing based on the received query parameters and based on the set reference date and time, which is a date and time different than a date and time of receiving the query, the set reference date and time determining that one or more of stored behavior histories of the plurality of users is a target of a search by the web search engine, the extraction processing being performed on the completion state of the stored behavior history information corresponding to the set reference date and time;

acquiring, as an extraction result, the number of users corresponding to the received query among and the plurality of users; and notifying the acquired number of users to the information user that transmitted the query.

12. A non-transitory computer readable storage medium having stored therein an extraction program, the extraction program causes a computer to execute:

acquiring behavior history information from a plurality of search servers that receive search queries from the plurality of users;

updating a memory with the acquired behavior history information from the plurality of search servers;

receiving a query from an information user indicating parameters of a search to be performed on the acquired and updated behavior history information stored in the memory at a most recent acquisition and update of the memory;

acquiring metadata from a metadata server including date and time information, which indicates an embedded date and time of completion of updating a most recent acquisition of behavior history information and a most recent update of the memory;

setting a reference date and time as the date and time of the completion of updating the most recent acquisition and updating the memory, the reference date and time identifying a completion state of the stored behavior history information in the memory to be used during extraction processing;

controlling a web search engine to execute extraction processing based on the received query parameters and based on the set reference date and time, which is a date and time different than a date and time of receiving the query, the set reference date and time determining that one or more of stored behavior histories of the plurality of users is a target of a search by the web search engine, the extraction processing being performed on the completion state of the stored behavior history information corresponding to the set reference date and time;

acquiring, as an extraction result, the number of users corresponding to the received query among and the plurality of users; and notifying the acquired number of users to the information user that transmitted the query.

\* \* \* \* \*